United States Patent [19]
Wu et al.

[11] Patent Number: 5,200,247
[45] Date of Patent: Apr. 6, 1993

[54] BIODEGRADABLE FILM CONTAINING AN ALKANOYL POLYMER/PVA BLEND AND METHOD OF MAKING SAME

[75] Inventors: Pai-Chuan Wu, Cincinnati; Frank Moore, Jr., Hamilton, both of Ohio; Thomas R. Ryle, Burlington, Ky.

[73] Assignee: Clopay Corporation, Cincinnati, Ohio

[21] Appl. No.: 893,672

[22] Filed: Jun. 5, 1992

[51] Int. Cl.$^5$ .............................................. B32B 3/26
[52] U.S. Cl. ................................ 428/131; 428/156; 428/315.5; 428/338; 523/124
[58] Field of Search .............. 428/131, 156, 315.5, 428/338; 523/124

[56] References Cited

U.S. PATENT DOCUMENTS

| | | | |
|---|---|---|---|
| 3,484,835 | 12/1969 | Trounstine et al. | 428/179 |
| 3,901,838 | 8/1975 | Clendinning et al. | 523/126 |
| 3,921,333 | 11/1975 | Clendinning et al. | 47/37 |
| 4,016,117 | 4/1977 | Griffin | 526/5 |
| 4,021,388 | 5/1977 | Griffin | 526/5 |
| 4,120,576 | 10/1978 | Babish | 355/3 |
| 4,125,495 | 11/1978 | Griffin | 526/5 |
| 4,218,350 | 8/1980 | Griffin | 264/137 |
| 4,420,576 | 12/1983 | Griffin | 524/47 |

FOREIGN PATENT DOCUMENTS

WO91/02025  2/1991  PCT Int'l Appl.

Primary Examiner—William J. Van Balen
Attorney, Agent, or Firm—Wood, Herron & Evans

[57] ABSTRACT

A biodegradable thermoplastic film is disclosed comprising a blend of an alkanoyl polymer and polyvinyl alcohol. The film can be stretched providing opacity and enhancing its biodegradability.

19 Claims, 5 Drawing Sheets

BIODEGRADABLE FILM CONTAINING AN ALKANOYL POLYMER/PVA BLEND AND METHOD OF MAKING SAME

BACKGROUND OF THE INVENTION

For several decades, it has been a goal of industry to make plastic sheet or film materials either environmentally degradable by sunlight, moisture, temperature and the like or biodegradable by microorganisms. Usually after environmental degradation, plastic sheet or film materials are then more susceptible to assimilation by microorganisms. In spite of considerable efforts, our lands are becoming inundated with plastic sheet or film materials, and articles made therefrom that will not degrade perhaps for centuries. It is, therefore, a continuing goal to make plastic sheet or film materials as fully degradable as possible. A biodegradable material is one that undergoes biological degradation which ultimately mineralizes (biodegrades to $CO_2$, water and biomass) in the environment like other known biodegradable matter such as paper and yard waste. It would be highly desirable to provide a plastic sheet or film material that is biodegradable especially in a municipal solid waste facility where it may undergo biodegradation in the presence of heat, moisture and microorganisms.

There is a particular need for biodegradable plastic sheet or film material in disposable diapers, sanitary pads, hygienic pads and the like. These products for practical purposes must satisfy such properties as water impermeability in order to prevent seepage of urine and other human waste products therethrough. In addition, such sheet or film materials must have sufficient tear, tensile and impact strengths to function in such useful articles. The same properties that make them useful, however, lead to their lack of biodegradability. A few examples of patents directed to biodegradable and environmentally degradable compositions or products include U.S. Pat. Nos. 3,901,838; 3,921,333; 4,016,117; 4,021,388; 4,120,576; 4,125,495; 4,218,350 and 4,420,576.

A number of problems exist in connection with certain biodegradable films. For instance, biodegradable thermoplastic starch-based polymeric films are known as disclosed in International Applns. Nos. EP90/01286 and WO91/02025. However, these films tend to be dry, brittle and moisture sensitive. Over time such films absorb water causing them to become soggy and they eventually disintegrate. Although biodegradable, their moisture sensitivity renders them unsuitable for use as water barriers in practical applications. Other thermoplastic water impermeable films have been proposed. But such films are usually tough and stiff thereby rendering them uncomfortable for use with diapers, sanitary pads, hygienic pads and the like. Therefore, against this background of prior art, it is evident that further improvements in biodegradable films are needed.

SUMMARY OF THE INVENTION

This invention is directed to a water impermeable and biodegradable thermoplastic film. Also, the film may be provided with a microporous structure to make it opaque. In another form, the film is incrementally stretched to provide unique handling properties and enhance its biodegradability while maintaining its water impermeability.

The biodegradable film comprises a blend of an alkanoyl polymer and polyvinyl alcohol. Each polymeric component of the film is biodegradable. "Biodegradable" means that the polymeric component is susceptible to being assimilated by microorganisms when buried in the ground o otherwise contacted with the organisms under conditions conducive to their growth. Ultimately, the film biodegrades to $CO_2$, water and biomass in the environment like other known biodegradable matter such as paper and yard waste.

One of the thermoplastic polymer components of the biodegradable film is selected from the group consisting of a thermoplastic dialkanoyl polymer and a thermoplastic oxyalkanoyl polymer. The polymeric component is polyvinyl alcohol, also known as hydrolyzed ethylene-vinyl acetate. These polymeric components together are biodegradable to render the polymeric film totally biodegradable.

In a preferred embodiment of this invention, about 10-25% polyvinyl alcohol are preblended with about 90 to 75% thermoplastic dialkanoyl or oxyalkanoyl polymer for extrusion to form the film. In its most preferred form, alkanoyl thermoplastic polymer is characterized by at least 10 weight percent of recurring oxycaproyl units. Other additives, stabilizers, slip agents, lubricants, pigments ($TiO_2$) and the like, may be added to the composition.

In another preferred embodiment of the present invention, the biodegradable film is cross directionally stretched forming an opaque film. Producing the opaque film by stretching can be accomplished at low stress levels. Micropores or microvoids can be produced by stretching the biodegradable film at room or ambient temperature in line with the extruder. The film may be heat set at elevated temperatures after stretching. It has been found that the biodegradable film can be cross directionally stretched at ambient temperature to form a microvoided opaque film.

In a further embodiment of the present invention, the biodegradable film has a plurality of post-extruded stretched areas along lines spaced substantially uniformly across the film surface areas and through the depth of the film. The stretched areas are separated by unstretched areas and have a thickness less than the unstretched areas. Moreover, the stretched areas weaken the film to further enhance its degradation while maintaining film water impermeability. Severe interdigitating stretching creates porosity in the film. Additionally, the biodegradable film can have a pattern embossed therein. Embossing is usually done during extrusion of the blend prior to stretching.

The biodegradable film can be used for diaper backsheets, sanitary napkins and pads, and other medical, packaging and garment applications. The film is especially suitable for garments because of its microporosity, texture, flexibility, and water impermeability.

The biodegradable thermoplastic film of this invention, its method of manufacture and breathability will be better understood with reference to the following detailed description.

DETAILED DESCRIPTION OF THE INVENTION

A. The Alkanoyl Polymer Component

More particularly, the biodegradable alkanoyl thermoplastic polymers which are suitable in the practice of the invention are the normally-solid oxyalkanoyl polymers and the normally-solid dialkanoyl polymers. These polymers are fully described in U.S. Pat. Nos. 3,921,333 and 3,901,838 and their disclosures are fully incorporated herein by reference for an understanding of the alkanoyl polymer component. Such polymers usually possess a reduced viscosity value of at least about 0.1 and upwards to about 12, and higher. These polymers having a wide span of usefulness possess a reduced viscosity value in the range of from about 0.2 to about 8. The normally-solid thermoplastic dialkanoyl polymers are further characterized in that they contain at least about 10 weight percent, desirably greater than about 20 weight percent, for the recurring linear dialkanoyl containing unit of the formula:

wherein R represents a divalent aliphatic hydrocarbon radical and wherein R' represents a divalent aliphatic hydrocarbon radical or a divalent aliphatic oxahydrocarbon radical.

The normally-solid thermoplastic oxyalkanoyl polymers, on the other hand, are characterized in that they contain at least about 10 weight percent, desirably greater than about 20 weight percent, of the oxyalkanoyl unit recurring therein, wherein x is an integer having a value of 2–7.

The biodegradable thermoplastic alkanoyl polymer most preferred in the practice of this invention is characterized by at least 10 weight percent of recurring oxycaproyl units of the formula The thermoplastic dialkanoyl polymers can be prepared by known methods. A general procedure for the preparation of poly (alkylene alkanedioate) glycols (or dicarboxy compounds) involves well-documented esterification techniques using predetermined amounts of an aliphatic diol and an alkanedioic acid as referred to in U.S. Pat. No. 3,901,838.

The thermoplastic oxyalkanoyl polymers can also be prepared by various methods. A general procedure involves reacting a large molar excess of the appropriate lactone, e.g., epsilon caprolactone, zeta enantholactone, and/or eta-caprylolactone with an organic initiator which contains two active hydrogen groups, e.g., hydroxyl, carboxyl, primary amino, secondary amino, and mixtures thereof, such groups being capable of opening the lactone ring whereby it adds as a linear chain (of recurring oxyalkanoyl units) to the site of the active hydrogen-containing group, at an elevated temperature, preferably in the presence of a catalyst, and for a period of time sufficient to produce the desired polymers. Thermoplastic oxycaproxyl polymers can also be prepared by reacting the cyclic ester, e.g., epsilon-caprolactone, and/or the corresponding hydroxyacid, e.g., 6-hydroxycaproic acid, and/or their oligomers, with a mixture comprising diol and dicarboxylic acid, using a molar excess of diol with relation to the dicarboxylic acid, or alternatively, using a molar excess of dicarboxylic acid with relation to the diol. These methods are further described in U.S. Pat. No. 3,901.838.

The molecular weight of the polycaprolactones is at least about 40,000, preferably about 80,000 ($M_n$) to be useful in film applications. The polycaprolactones sold under "Tone Polymers" which have a $M_n$ between 40,000 (PCL-767) to 80,000 (PCL-787) are suitable for this invention.

B. Polyvinyl Alcohol Component

The aklanoyl polymer is blended with a polyvinyl alcohol, i.e., a hydrolyzed ethylene-vinyl acetate having from 5 to 99% of hydrolyzed acetate groups. Particularly preferred are ethylene-vinyl acetate copolymers having a vinyl acetate molar content of from 12 to 80% and hydrolyzed from about 87 to about 99%. Polyvinyl alcohol (PVOH) polymers are available commercially. The PVOH polymers sold under "Vinex" by Air Products having hydrolyzation from about 87% (Vinex 2034) to about 99% (Vinex 1003), and about 70,000 $M_n$ to about 100,000 $M_n$, respectively, are preferred.

In the blended composition, the alkanoyl polymer (PCL) and polyvinyl alcohol (PVOH) may be present in an amount of about 75 to 90% PCL and about 25 to 10% PVOH with 80% PCL and 20% PVOH being preferred. The copolymers may be used in mixtures with each other or, to advantage, may be mixed with another biodegradable polymeric or other component that does not materially alter the basic characteristics of the composition.

For instance, coextruded layers of films of this invention with other layers of polymers such as destructured starch that are biodegradable may be used. Two or three, or more, of such layers may be extruded.

C. Biodegradable Film Extrusion

The polyvinyl alcohol is blended with the previously described thermoplastic alkanoyl polymer and is extruded to form the biodegradable film. For purposes of the invention, extrusion of the biodegradable thermoplastic film formulation is achieved by the use of an extruder and a die. The die temperature ranges from about 400° F. to 450° F. The films are slot die extruded using a 2½" extruder at the barrel temperatures from about 350° F. to 450° F. Typically, depending on extrusion conditions, a biodegradable film of this invention extruded into films from about 1 to 25 mils, preferably 1–5 mils, can be produced at approximately 100 fpm line speed when a 2½" extruder is used with a screw speed of approximately 65 rpm. The presently described biodegradable film is made according to this procedure. It is to be understood that the extrusion techniques are well known to those versed in the art and need not be discussed in further detail.

D. Cross Directional Stretching

By cross directionally stretching the extruded biodegradable film, the molecular structure of the film fractures creating micropores or microvoids. The microvoid formation causes opacity in the biodegradable thermoplastic film. The microporosity allows air and moisture vapor to permeate through the film. Further, the increased surface area by stretching the film accordingly enhances the biodegradability of the film.

Various types of stretching techniques can be employed to vary the degrees of opacity and enhance biodegradation. Upon stretching, the translucent film becomes opaque without the addition of any opacifiers such as titanium dioxide. The opacity of the film is the result of light trapped in the microvoids or micropores caused by the molecular fracture of the biodegradable film.

E. Incremental Stretching

After extruding the blended formulation of the film, the biodegradable film may also be stretched in accordance with the incremental stretching techniques described in copending application Ser. No. 07/478,935, filed Feb. 12, 1990 in the names of Pai-Chuan Wu, Thomas R. Ryle, Robert M. Mortellite and J. David Toppen and the details of such stretching are incorporated herein by reference. One of the stretchers and techniques disclosed therein is described as follows:

1. Diagonal Intermeshing Stretcher

The diagonal intermeshing stretcher consists of a pair of left hand and right hand helical gearlike elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gearlike teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

A drive means is typically utilized to drive the stationery intermeshing roll. If the upper intermeshing roll is to be disengageable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addendums of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5,935" diameter, 45° helix angle, a 0.100" normal pitch, 30 diametral pitch, 14¼° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Cross Direction Intermeshing Stretcher

The CD intermeshing stretching equipment is identical to the diagonal intermeshing stretcher with differences in the design of the intermeshing rolls and other minor areas noted below. Since the CD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the CD intermeshing elements.

The CD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

3. Machine Direction Intermeshing Stretcher

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 Diametral pitch, 14¼° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

4. Incremental Stretching Technique

The above described diagonal intermeshing stretcher may be employed in the following examples to produce the incrementally stretched embossed or unembossed biodegradable film. The stretching operation occurs after the biodegradable film is extruded and has solidified to permit incremental stretching. The woven taffeta pattern in accordance with U.S. Pat. No. 3,484,835 may be provided and the biodegradable film is incrementally stretched using the diagonal and/or CD and MD intermeshing stretcher. Upon stretching with one pass through the diagonal intermeshing stretcher with a depth of roller engagement at about 0.085", an embossed film provides post-embossed stretched areas. The original emboss in the unstretched areas is mostly intact. During the stretching process, the thin areas will stretch preferentially to the thick areas due to the lower resistance to the stretching force. In addition, the stretching process weakens and increases the overall area of the biodegradable film by about 44%. Stretched films having thicknesses of about 1-10 mils are provided. The area increase affected by diagonal stretching consists of dimensional increases in both the machine and cross direction. The weakened biodegradable film enables degradation to occur more readily yet the film is impermeable to water so as to function as a water barrier backsheet for diapers and pads.

DETAILED EXAMPLES OF THE INVENTION

The following examples illustrate biodegradable films of this invention and methods of making the biodegradable films. In light of these examples and this further detailed description, it will become apparent to a person of ordinary skill in the art that variations thereof may be made without departing from the scope of this invention.

The invention will also be further understood with reference to the drawings in which.

EXAMPLES 1-6

Different blended ratios of polycaprolactone (Union Carbide's Tone Polymer, PCL-787 having an average molecular weight of about 80,000) and polyvinyl alcohol at 99% hydrolyzed (Air Products Vinex 1003) were slot die extruded into films of about 4 mils by using a 2.5" extruder with a screw speed of approximately 65 rpm and extrusion speed of approximately 20 fpm at a melt temperature of about 400° F. The alkanoyl polymer is in accordance with the teachings of the above-incorporated patents by reference. The extruded films were mechanically stretched cross machine directionally at speeds typically about 10 to 100 inches per minute at ambient temperature.

Figure 5:
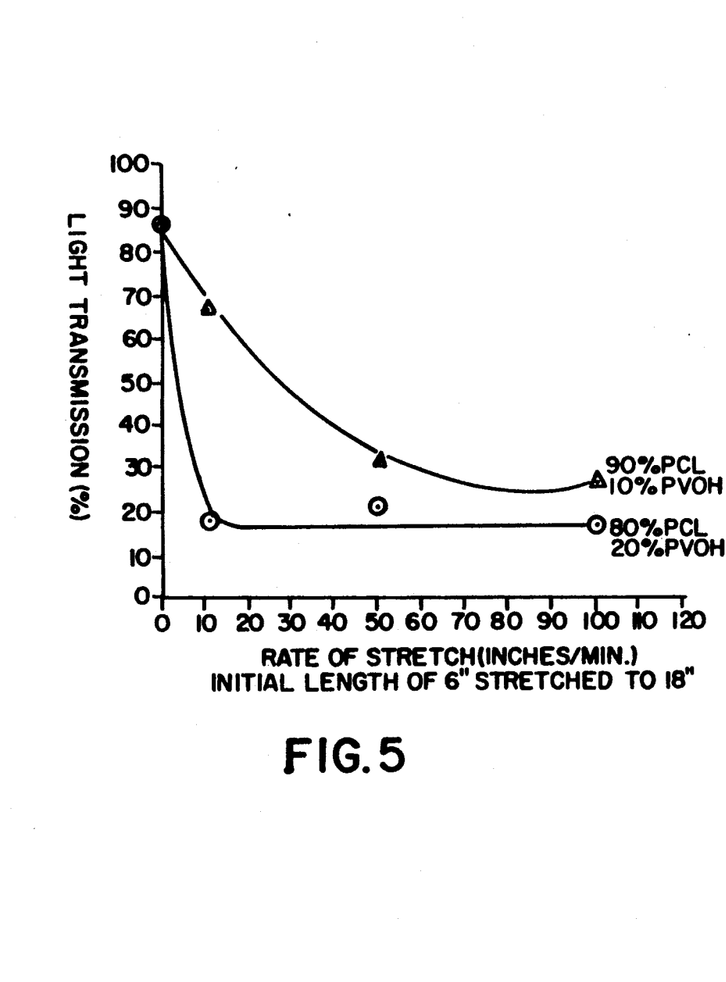
FIG. 5 is a graph indicating opacity of the biodegradable film after cross-machine directional stretching.

For comparison, it is noted that 100% PCL film as well as 100% PVOH film do not turn into a pearl-like opaque film upon stretching. However, blends in accordance with this invention (See FIGS. 1-4 and 8-9) do form micropores/microvoids upon stretching. The microvoids/micropores are small enough that they will trap the light in the film producing opacity as evidenced by the light transmission and density measurements (See FIGS. 5-6). These films without stretching are easily extrudable and suitable for any biodegradable film application.

EXAMPLE 1

A formulation of 80% PCL-676 and 20% Vinex 1003 was dry blended and slot die extruded into a film of 4 mils by using a conventional plastic plastication extruder as above described. The film has mechanical properties suitable for film applications as disclosed in Table 1.

TABLE 1

| | ULTIMATE TENSILE (PSI) | TENSILE STRENGTH AT 10% ELONGATION (PSI) | ELMENDORF TEAR STRENGTH UNNOTCHED (GRAMS/INCH) |
|---|---|---|---|
| Machine Direction | 3750 | 2150 | 150 |
| Cross-Machine Direction | 3550 | 1560 | 170 |

EXAMPLE 2

The films described in Example 1 (4 mils) were cross-machine stretched at 10"/min to 200% elongation (initial length of 6" to a final length of 18"). The film, now 1.8 mils, becomes total opaque from its original transulcent state. The totally opaque film has the mechanical properties suitable for film applications as disclosed in TABLE 2.

TABLE 2

| | ULTIMATE TENSILE (PSI) | TENSILE STRENGTH AT 10% ELONGATION (PSI) | ELMENDORF TEAR STRENGTH UNNOTCHED (GRAMS/INCH) |
|---|---|---|---|
| Machine Direction | 1800 | 600 | 300 |
| Cross-Machine Direction | 9000 | 1600 | 250 |

EXAMPLE 3

The film described in Example 2 was further MD stretched at 10"/min to 100% elongation. The film, then, has a thickness of 1.6 mils, and is suitable for any film application as disclosed in TABLE 3.

TABLE 3

| | ULTIMATE TENSILE (PSI) | TENSILE STRENGTH AT 10% ELONGATION (PSI) | ELMENDORF TEAR STRENGTH UNNOTCHED (GRAMS/INCH) |
|---|---|---|---|
| Machine Direction | 2800 | 1600 | 500 |
| Cross-Machine | 5000 | 400 | 125 |

TABLE 3-continued

| | ULTIMATE TENSILE (PSI) | TENSILE STRENGTH AT 10% ELONGATION (PSI) | ELMENDORF TEAR STRENGTH UNNOTCHED (GRAMS/INCH) |
|---|---|---|---|
| Direction | | | |

EXAMPLE 4

Formulations of 90% PCL-787 and 10% Vinex 1003, and 80% PCL-787 and 20% Vinex 1003 were extruded into films at approximately 4 mils, respectively. These films are translucent with a light transmission in the neighborhood of 87% and a density approximately 1.1 grams per cubic centimeter.

Figure 1:
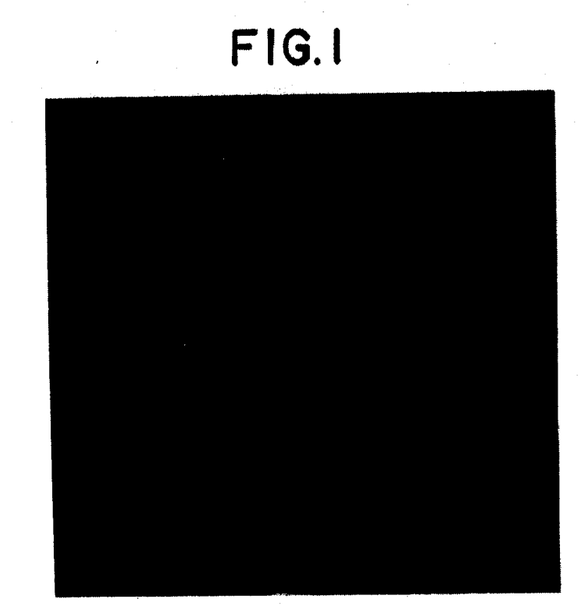
FIG. 1 is an enlarged (1000x) photographic view of the biodegradable translucent film surface before stretching.
Figure 2:
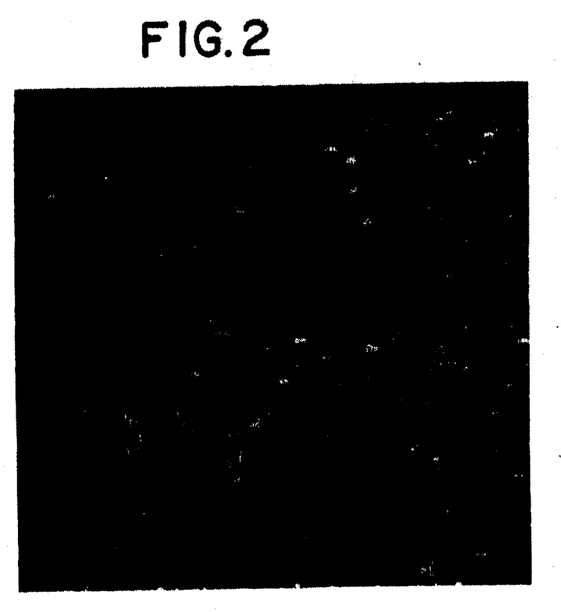
FIG. 2 is an enlarged (1000x) photographic view of the biodegradable opaque film surface after stretching illustrating micropore formation.
Figure 3:
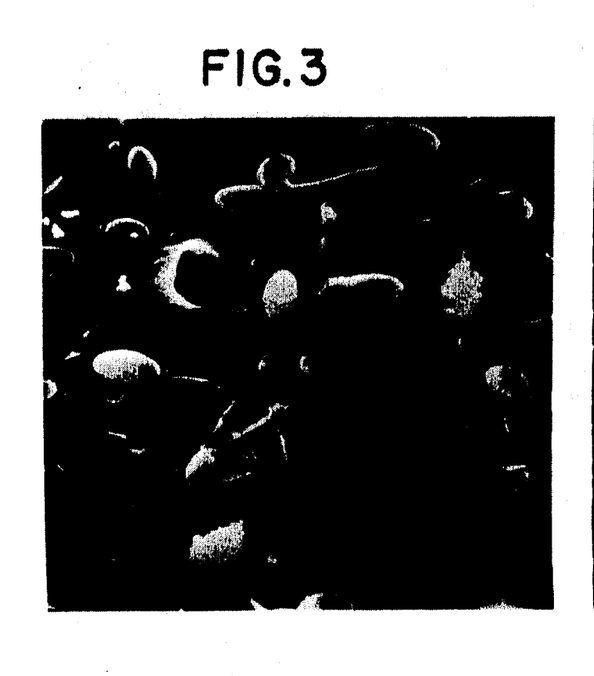
FIG. 3 is an enlarged (2000x) photographic cross-sectional view of the biodegradable film of FIG. 1 illustrating polymer blend formation through the depth of a biodegradable film.
Figure 4:
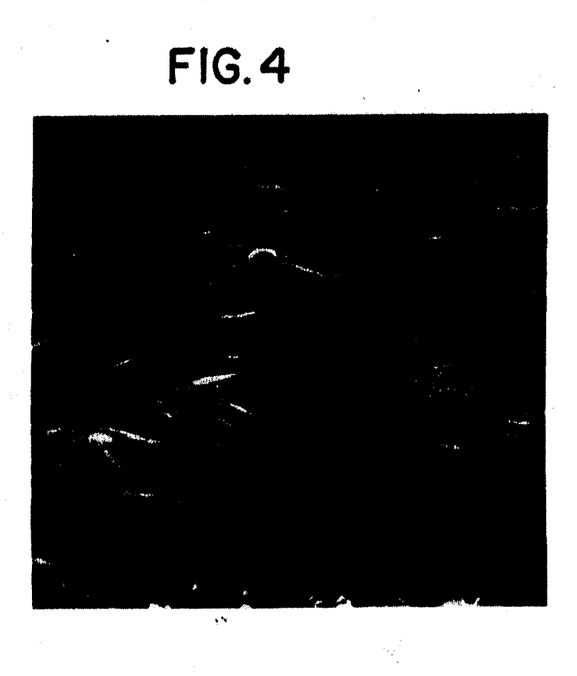
FIG. 4 is an enlarged (2000x) photographic cross-sectional view of the biodegradable film of FIG. 2 after stretching illustrating microvoids through the film depth.
Figure 6:
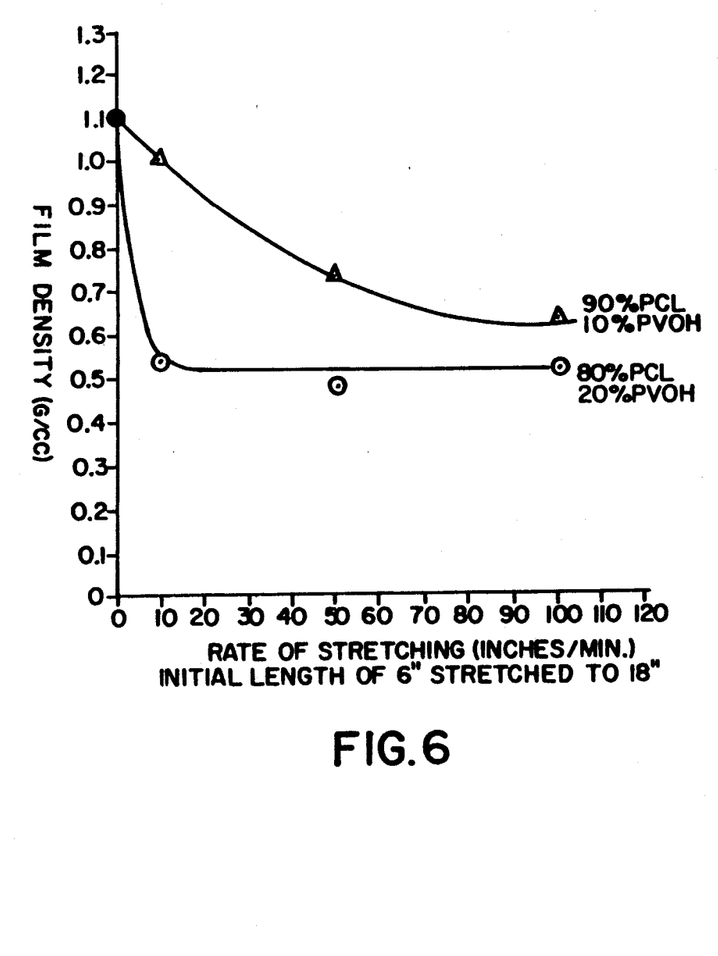
FIG. 6 is a graph illustrating the film density of the biodegradable film after cross-machine directional stretching.
Figure 7:
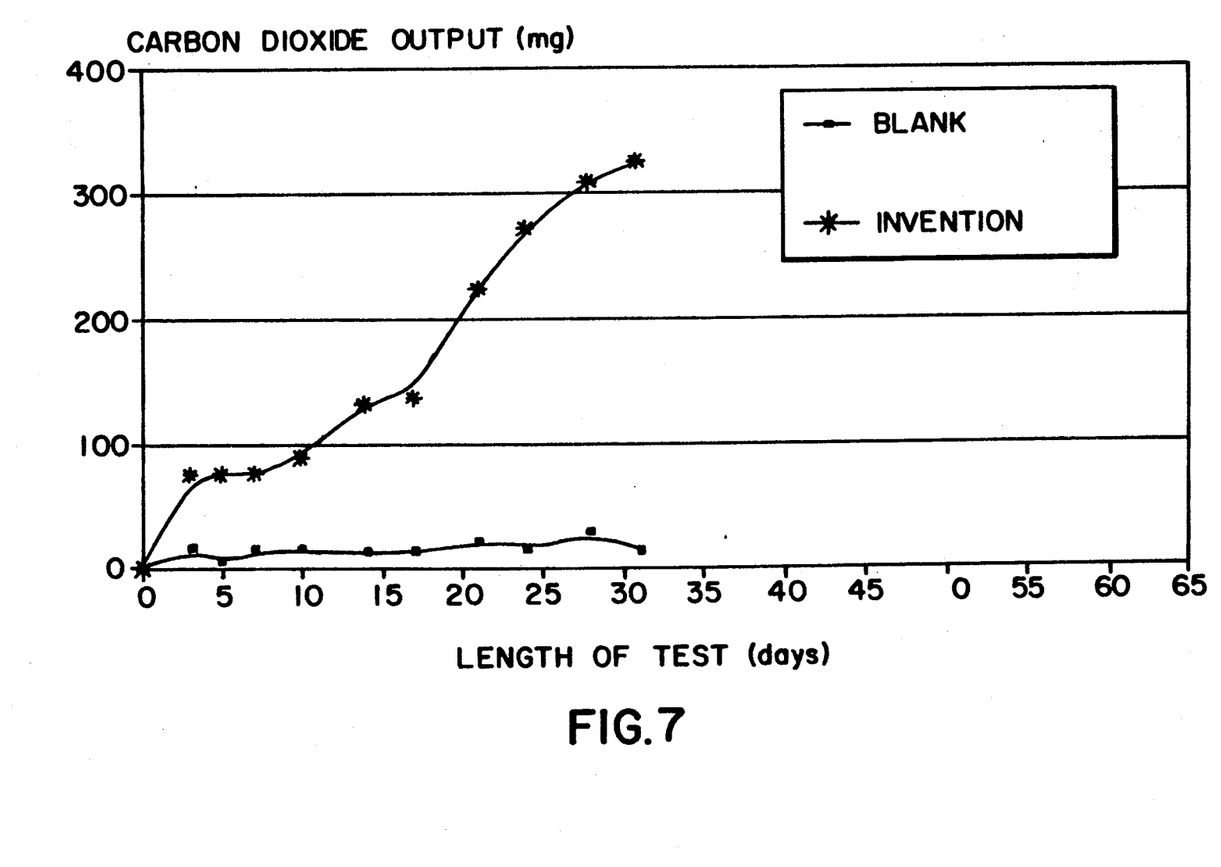
FIG. 7 is a graph illustrating the biodegradability of the film.

When these films were stretched from their original 6" to 18" in cross-machine direction at various rates of stretching (i.e., 10"/min, 50"/min, etc.), these films all became opaque with light transmission between 10–40% (see attached FIG. 5) with density between 0.5 to 0.8 grams/CM$^3$ (see attached FIG. 6). The films changed from translucent to totally opaque with reduced density evidencing the micromolecular fracture with microvoids formation. See FIG. 1 on the surface and FIG. 3 for the cross-section of the non-stretched, translucent film; FIG. 2 on the surface and FIG. 4 for the cross-section of the stretched and opaque film.

EXAMPLE 5

The film described in Example 2 was interdigitated on the cross machine direction, with the depth of the engagement of the stretcher at 0.090". The film then was interdigitated again on the machine direction, with the depth of the engagement of the stretcher also at 0.090".

Figure 8:
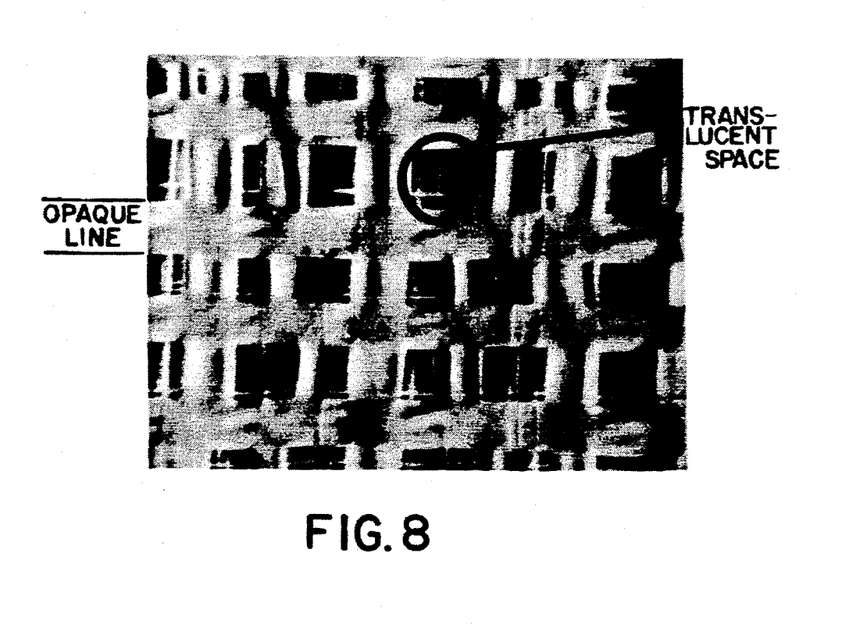
FIG. 8 is an enlarged (20x) photographic view of the biodegradable film of FIG. 2 after cross-machine direction (CD) and machine direction (MD) stretching illustrating a wovenlike structure with opaque microvoid lines and translucent non-microvoid areas.
Figure 9:
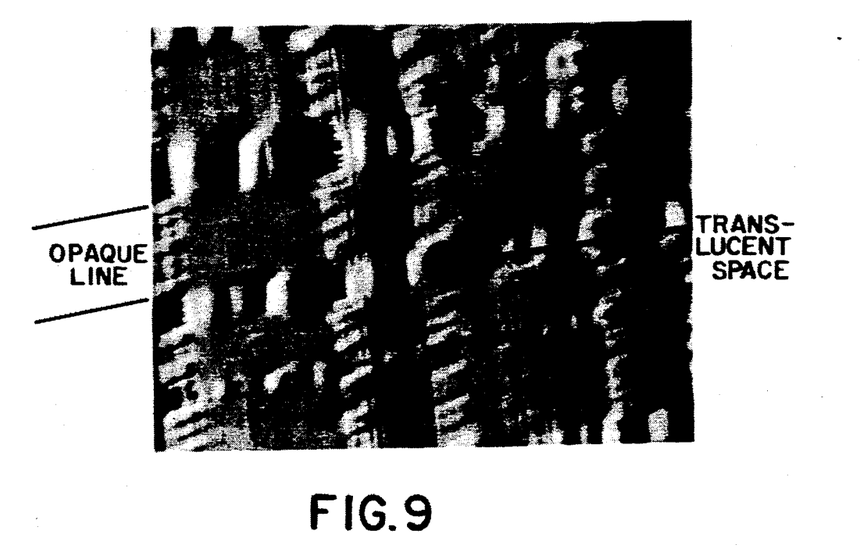
FIG. 9 is the same enlarged view of the film of FIG. 8 with further stretching in both the CD and MD.

FIG. 8 shows the result of this biodegradable film. A woven-like structure with microvoid lines (opaque area) and nonmicrovoided areas (translucent areas) was formed as shown. The translucent areas can be altered by the stretcher's spacing as well as repeated CD and MD interdigitating. The film shown in FIG. 8 has translucent areas generally about 0.025"×0.025" or smaller. They are not necessarily square, but may be rectangular or diamond in shape. FIG. 9 shows the film on FIG. 8 was further interdigitated again on the CD followed with MD. The translucent area now becomes approximately 0.006"×0.006" or smaller. Again, the areas do not have to be regular. They can be square, rectangular or diamond in shape.

These films as described above are suitable for biodegradable, woven-like garments as well as diaper backsheet applications.

EXAMPLE 6

The film described in Example 2 was tested for its biodegradability using ASTM D5209, a modified Sturm Test where the sample is immersed in a sewage sludge solution with multiple bacteria. When the sample is consumed by the bacteria, the $CO_2$ will evolve. The original sample size is 0.40 grams with a total surface area of 44"$^2$ and a thickness of 1.8 mils. FIG. 9 evidenced that $CO_2$ continued to evolve when the film was consumed by the bacteria.

In view of the above detailed description, other variations will become apparent without departing from the scope of this invention.

What is claimed is:

1. A biodegradable thermoplastic film comprising a blend of
   (a) an alkanoyl thermoplastic polymer selected from the group consisting of
      (i) a thermoplastic dialkanoyl polymer characterized in that at least about 10 percent of said polymer is attributable to recurring dialkanoyl units of the formula wherein R represents a divalent aliphatic hydrocarbon radical; and wherein R' is of the group consisting of divalent aliphatic hydrocarbon radicals and divalent aliphatic oxahydrocarbon radicals, and
      (ii) a thermoplastic oxyalkanoyl polymer of the formula wherein x is an integer having a value of about 2 to 7 and mixtures thereof, and
   (b) polyvinyl alcohol.

2. The biodegradable film of claim 1 wherein said film comprises about 10 to about 25 percent by weight polyvinyl alcohol and about 90 to about 75 percent by weight alkanoyl polymer.

3. The biodegradable film of claim 1 wherein said film is stretched at ambient temperature to form a microvoided opaque film.

4. The biodegradable film of claim 1 wherein said film has a plurality of post extruded stretched areas along lines spaced substantially uniformly across the film surface areas and through the depth of the film, said stretched areas being separated by unstretched areas, said stretched areas for weakening said film to further enhance its degradation while maintaining its water impermeability.

5. The biodegradable film of claim 1 wherein said oxyalkanoyl thermoplastic polymer is characterized by at least 10 weight percent of recurring oxycaproyl units of the formula.

6. The biodegradable film of claim 2 wherein said thermoplastic alkanoyl polymer and polyvinyl alcohol are extruded to form said film.

7. A biodegradable film suitable for use in diapers, sanitary, medical and like applications comprising a blend of
   a biodegradable alkanoyl thermoplastic polymer selected from the group consisting of
   (a) a thermoplastic dialkanoyl polymer characterized in that at least about 10 percent of said polymer is attributable to recurring dialkanoyl units of the formula wherein R represents a divalent aliphatic hydrocarbon radical; and wherein R' is of the group consisting of divalent aliphatic hydrocarbon radicals and divalent aliphatic oxahydrocarbon radicals, and (b) a thermoplastic oxyalkanoyl polymer of the formula wherein x is an integer having a value of about 2 to 7; and a biodegradable polyvinyl alcohol having a hydrolyzation from about 87% to about 99%.

8. The biodegradable film of claim 7 wherein said film is stretched at ambient temperature to form a microvoided opaque film.

9. The biodegradable film of claim 7 wherein said film has a plurality of post extruded stretched areas along lines spaced substantially uniformly across the film surface areas and through the depth of the film, said stretched areas being separated by unstretched areas and having a thickness less than the unstretched areas, said stretched areas for weakening said film to further enhance its degradation while maintaining its water impermeability.

10. The biodegradable film of claim 9 wherein said film has a pattern embossed therein and said plurality of stretched areas are post-embossed through the depth of the embossed file.

11. The biodegradable film of claim 1 wherein said film has a thickness of about 1 to about 25 mils.

12. The biodegradable film of claim 1 wherein said dialkanoyl thermoplastic polymer is polycaprolactone.

13. A method of making the biodegradable film of claim 1 comprising extruding a blend of said (a) and (b) components to form said film.

14. The method of claim 13 comprising cross-directionally stretching the extruded film to form an opaque film.

15. The method of claim 13 wherein said cross-directional stretching is at ambient temperature.

16. The method of claim 13 comprising interdigitatingly stretching said extruded film along lines spaced substantially uniformly across the surfaces thereof and through the depth of the film, said stretched areas being separated by unstretched areas and having a thickness less than the unstretched areas, said stretched areas for weakening the strength of said film to further enhance its degradation while maintaining its water impermeability.

17. The method of claim 13 comprising the further step of embossing the extruded film.

18. The method of claim 14 wherein said film has a thickness of about 1 to about 10 mils after stretching.

19. The method of claim 13 wherein said dialkanoyl thermoplastic polymer component is a polycaprolactone.

* * * * *